(12) United States Patent
Bansal (10) Patent No.: US 11,388,177 B2
(45) Date of Patent: Jul. 12, 2022

(54) SYSTEMS AND METHODS FOR SECURITY AND CONTROL OF INTERNET OF THINGS AND ZEROCONF DEVICES USING CLOUD SERVICES

(71) Applicant: Zscaler, Inc., San Jose, CA (US)

(72) Inventor: Abhinav Bansal, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 78 days.

(21) Appl. No.: 16/668,323

(22) Filed: Oct. 30, 2019

(65) Prior Publication Data
US 2020/0067949 A1   Feb. 27, 2020

Related U.S. Application Data (63) Continuation of application No. 15/704,299, filed on Sep. 14, 2017, now Pat. No. 10,498,750.

(51) Int. Cl.
*H04L 29/06* (2006.01)
*H04L 9/40* (2022.01)
*H04L 67/10* (2022.01)

(52) U.S. Cl.
CPC .......... *H04L 63/1416* (2013.01); *H04L 63/20* (2013.01); *H04L 67/10* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 9,621,574 B2 | 4/2017 | Desai et al. | |
| 10,169,434 B1 | 1/2019 | Block et al. | |
| 10,257,165 B2 | 4/2019 | Obaidi | |
| 2014/0207282 A1* | 7/2014 | Angle | H04W 4/30 901/1 |
| 2015/0007273 A1* | 1/2015 | Lin | H04L 47/10 726/4 |
| 2015/0143504 A1 | 5/2015 | Desai et al. | |
| 2015/0324616 A1* | 11/2015 | Alarabi | G06F 21/88 726/25 |
| 2015/0351129 A1* | 12/2015 | Kourzanov | H04W 84/12 370/252 |
| 2016/0050227 A1 | 2/2016 | Desai et al. | |
| 2016/0212099 A1* | 7/2016 | Zou | H04L 63/0263 |
| 2016/0241439 A1 | 8/2016 | Idnani et al. | |
| 2016/0285904 A1* | 9/2016 | Ye | H04L 63/1425 |

(Continued)

*Primary Examiner* — William J. Goodchild
(74) *Attorney, Agent, or Firm* — Lawrence A. Baratta, Jr.

(57) ABSTRACT

Systems and methods for security and control of Internet of Things (IOT) and ZeroConf devices using cloud services. The present disclosure uses an application that runs on a user device in a promiscuous mode to look for potentially vulnerable and compromised machines on the local network. Specifically, the user device can fingerprint ZeroConf and IOT networks based on their static and dynamic behavior. The application discovers all hosts on the network and uses a cloud service such as via a cloud-based system to detect potentially malicious IOTs with known vulnerabilities. Based on an enterprise policy or user's preferences, the solution can alert if any IOT device tries to communicate with the user's device or if the user's device itself broadcasts services running on the device such as screen sharing/file sharing.

20 Claims, 5 Drawing Sheets

(56) References Cited

U.S. PATENT DOCUMENTS

| | | |
|---|---|---|
| 2016/0301707 A1* | 10/2016 | Cheng .................... H04L 67/12 |
| 2017/0033984 A1 | 2/2017 | Lear et al. |
| 2017/0078328 A1 | 3/2017 | Mcginnity et al. |
| 2017/0223024 A1 | 8/2017 | Desai et al. |
| 2017/0288965 A1* | 10/2017 | Cebere ................ H04L 12/4625 |
| 2017/0339559 A1 | 11/2017 | Caracas et al. |
| 2018/0124096 A1 | 5/2018 | Schwartz et al. |
| 2018/0323731 A1* | 11/2018 | Swaaley .................. H02P 3/24 |

* cited by examiner

SYSTEMS AND METHODS FOR SECURITY AND CONTROL OF INTERNET OF THINGS AND ZEROCONF DEVICES USING CLOUD SERVICES

CROSS-REFERENCE TO RELATED APPLICATION(S)

The present disclosure is a continuation of U.S. patent application Ser. No. 15/704,299, filed Sep. 14, 2017, and entitled "Systems and methods for security and control of Internet of Things and ZeroConf devices using cloud services," the contents of which are incorporated herein by reference.

FIELD OF THE DISCLOSURE

The present disclosure generally relates to networking systems and methods. More particularly, the present disclosure relates to systems and methods for security and control of Internet of Things (IOT) and ZeroConf devices using cloud services such as through a cloud-based security system.

BACKGROUND OF THE DISCLOSURE

The Internet of Things (IOT) is the inter-networking of physical devices, vehicles (also referred to as "connected devices" and "smart devices"), buildings, and other items embedded with electronics, software, sensors, actuators, and network connectivity which enable these objects to collect and exchange data. There has been a surge in IOT devices that have now become a part of everyday use. Some popular IOT devices include Wifi Cameras, printers, home entertainment systems, IP phones, thermostats, home security systems, etc. With the significant adoption of IOT devices and increase in user mobility, new avenues have been opened up for attackers to compromise and steal sensitive user information. IOT devices have been notorious for poor security and have been successfully used for spreading malware, Distributed Denial of Service (DDOS) attacks and data theft. However, there are no security solutions or established standards to tackle the challenges in controlling the wide variety of IOT devices. Most IOT devices need little or zero configuration (ZeroConf) for setup which makes them user-friendly as the device starts working as soon as you switch it on. With zero configuration protocols like Bonjour/Avahi, clients automatically discover available services as the service configures itself in the network. While this reduces the burden to configure each and every service manually, this creates a huge blind spot as users of these devices are totally agnostic of the network behavior of these devices and have zero ways to monitor them for suspicious activities. For instance, when installing a printer on the network, the printer can register itself using ZeroConf and the clients can discover the printer automatically and do not need to add or delete printers explicitly. This poses a huge security risk, for instance when trying to print a sensitive document, the user may connect to a vulnerable printer that may be compromised and leak the user's data to a remote server. Such compromised IOT devices usually go undetected by using traditional point security solutions that monitor traffic from the user's device to the Internet and fail to consider malicious or compromised vectors within the network that the device is connected to. Most IOT devices also run with default configurations including default usernames and passwords which have been infamously used to create a large DDOS attack on popular Internet web services.

BRIEF SUMMARY OF THE DISCLOSURE

In an exemplary embodiment, a method of monitoring and controlling Internet of Things (IOT) and ZeroConf devices using a cloud-based security system includes receiving fingerprints of the IOT and ZeroConf devices and data related to operation from a plurality of user devices; receiving updates related to the IOT and ZeroConf devices, configuration thereof, and proper operation thereof; determining security risk of the IOT and ZeroConf devices based on the fingerprints, the data related to operation, and the updates; and providing the security risk to the plurality of user devices and causing one or more policy-based actions to be performed based on the security risk. Each of the plurality of user devices can execute an application which listens on a local network for the IOT and ZeroConf devices and determines the fingerprints and the data related to operation. The application can listen in a promiscuous mode on the local network and periodically communicate the fingerprint and data related to operation to the cloud-based security system. The one or more policy-based actions can be performed through the application. The application can maintain properties of the IOT and ZeroConf devices on the local network and periodically check for changes in the properties. The one or more policy-based actions can include blocking services of the IOT and ZeroConf devices and/or ports on the local network, via the application. The security risk can be determined based on a comparison and weighted score of the fingerprints and the data related to operation compared to the updates. The security risk can be based in part on whether the IOT and ZeroConf devices utilize factory defined login credentials. The security risk can be based in part on whether the IOT and ZeroConf devices exhibit traffic spikes. The one or more policy-based actions can include blocking services associated with the IOT and ZeroConf devices based on an enterprise's policy.

In another exemplary embodiment, a cloud node in a cloud-based security system configured to monitor and control Internet of Things (IOT) and ZeroConf devices includes a network interface; a processor communicatively coupled to the network interface; and memory storing instructions that, when executed, cause the processor to receive fingerprints of the IOT and ZeroConf devices and data related to operation from a plurality of user devices; receive updates related to the IOT and ZeroConf devices, configuration thereof, and proper operation thereof; determine security risk of the IOT and ZeroConf devices based on the fingerprints, the data related to operation, and the updates; and provide the security risk to the plurality of user devices and cause one or more policy-based actions to be performed based on the security risk. Each of the plurality of user devices can execute an application which listens on a local network for the IOT and ZeroConf devices and determines the fingerprints and the data related to operation. The application can listen in a promiscuous mode on the local network and periodically communicates the fingerprint and data related to operation to the cloud-based security system. The one or more policy-based actions can be performed through the application. The application can maintain properties of the IOT and ZeroConf devices on the local network and periodically checks for changes in the properties. The one or more policy-based actions can include blocking services of the IOT and ZeroConf devices and/or ports on the local network, via the application. The security risk can be determined based on a comparison and weighted score of the fingerprints and the data related to operation compared to the updates. The security risk can be based in part on whether the IOT and ZeroConf devices utilize factory defined login credentials. The one or more policy-based actions can include blocking services associated with the IOT and ZeroConf devices based on an enterprise's policy.

In a further exemplary embodiment, a method of monitoring and controlling Internet of Things (IOT) and Zero-Conf devices using an application executed on a processing device and a monitoring service includes executing an application on the processing device; listening to a local network to detect the IOT and ZeroConf and associated services; determining fingerprints of the IOT and ZeroConf devices based on the listening; providing the fingerprints and data related to operation to the monitoring service; receiving a security risk of the IOT and ZeroConf devices from the monitoring service based on the fingerprints and the data related to operation; and providing the security risk to a user and performing one or more policy-based actions based on the security risk.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like;

DETAILED DESCRIPTION OF THE DISCLOSURE

In various exemplary embodiments, the present disclosure relates to systems and methods for security and control of Internet of Things (IOT) and ZeroConf devices using cloud services such as through a cloud-based security system. The present disclosure describes a security solution for ZeroConf and IOT networks using an application that runs on a user device in a promiscuous mode to look for potentially vulnerable and compromised machines on the local network. Specifically, the user device can fingerprint ZeroConf and IOT networks based on their static and dynamic behavior. The application discovers all hosts on the network and uses a cloud service such as via a cloud-based system to detect potentially malicious IOTs with known vulnerabilities. Based on an enterprise policy or user's preferences, the solution can alert if any IOT device tries to communicate with the user's device or if the user's device itself broadcasts services running on the device such as screen sharing/file sharing. Since the services automatically register themselves on the network, naive users are not even aware of all services that are running on their own device that can be exploited by other machines on the same network. The application can monitor these services to provide better control and visibility to the users as well as IT administrators. Depending upon the network type, the IT administrator may also control the services that a user can access or broadcast to other users on the same network.

Exemplary Cloud System Architecture

Figure 1:
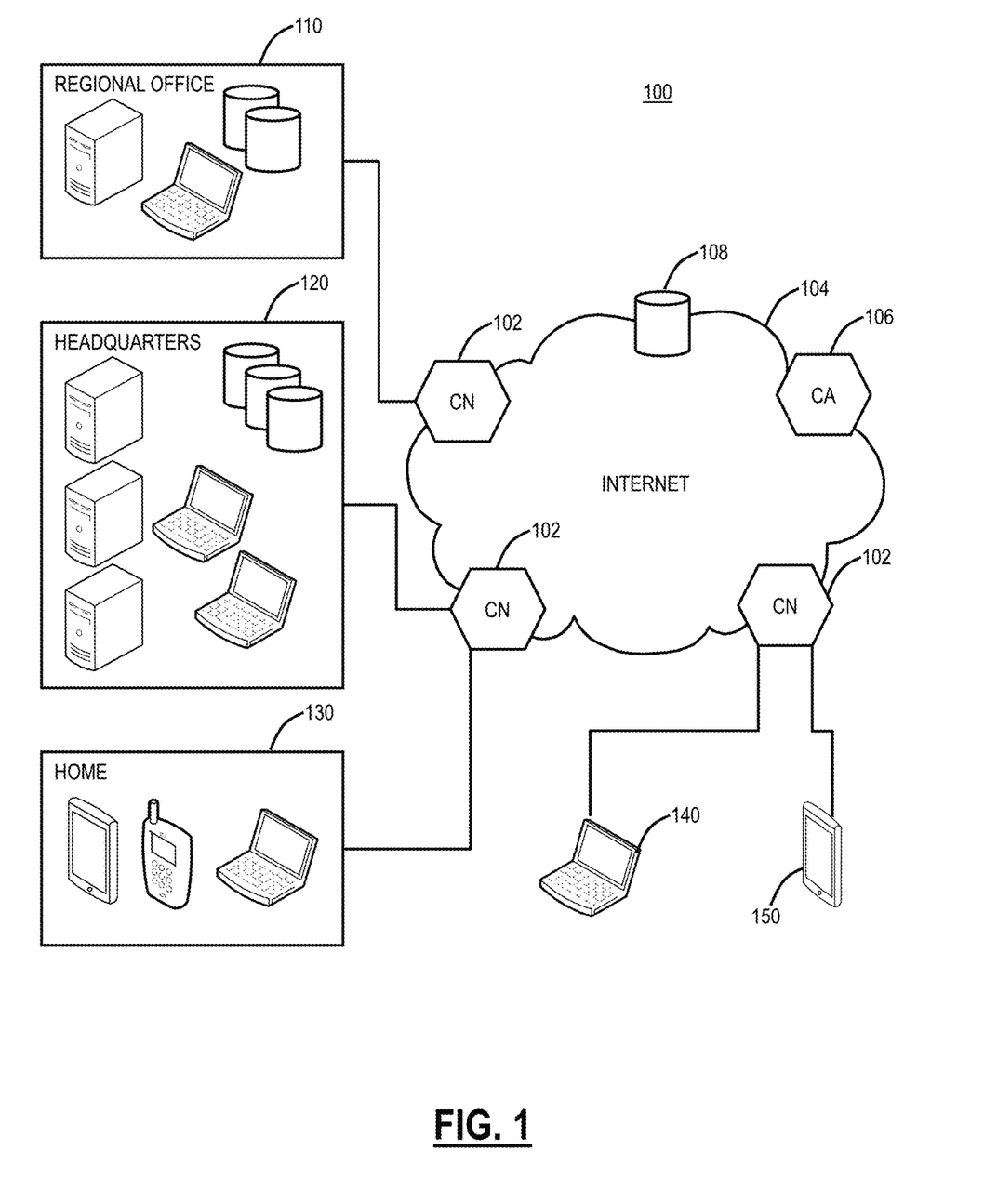
FIG. 1 is a network diagram of a cloud-based system for implementing various cloud-based service functions.
Figure 2:
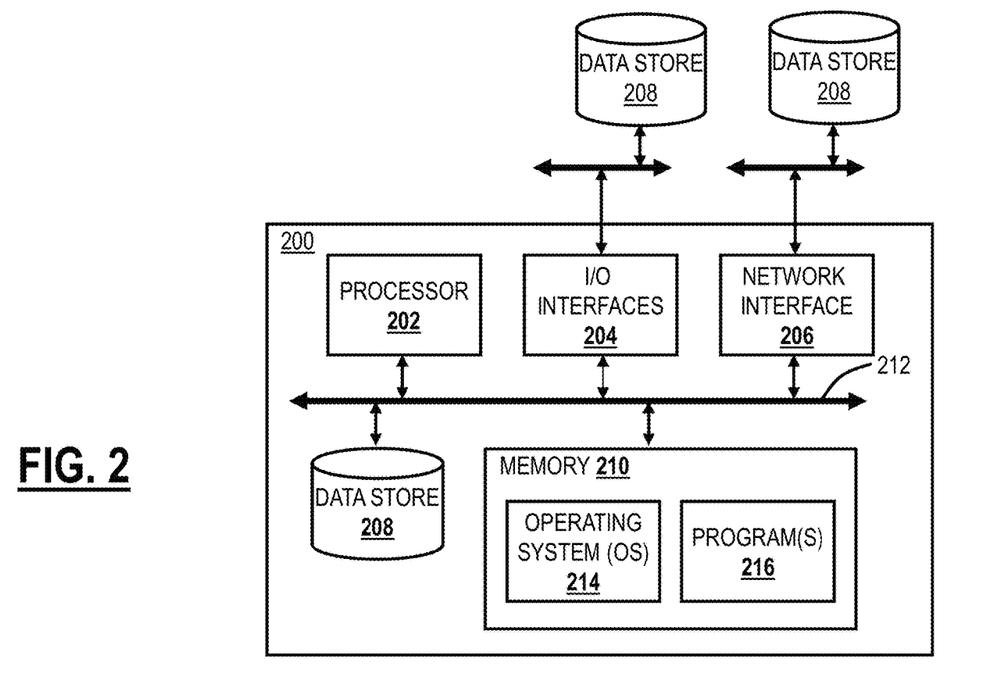
FIG. 2 is a block diagram of a server which may be used in the cloud-based system of FIG. 1, in other systems, or stand-alone.

Referring to FIG. 1, in an exemplary embodiment, a network diagram illustrates a cloud-based system 100 for implementing various cloud-based service functions. The cloud-based system 100 includes one or more cloud nodes (CN) 102 communicatively coupled to the Internet 104 or the like. Also, the cloud-based system 100 can also include one or more Central Authorities (CA) 106 and one or more log nodes 108, and each of the components 102, 106, 108 can be communicatively coupled to one another via the Internet 104. The cloud nodes 102, the central authorities 106, and the log nodes 108 may be implemented as a server 200 (as illustrated in FIG. 2), or the like, and can be geographically diverse from one another such as located at various data centers around the country or globe. For illustration purposes, the cloud-based system 100 can connect to a regional office 110, headquarters 120, various employee's homes 130, laptops/desktops 140, and mobile devices 150 each of which can be communicatively coupled to one of the cloud nodes 102 via the Internet 104. These locations 110, 120, 130 and devices 140, 150 are shown for illustrative purposes, and those skilled in the art will recognize there are various access scenarios to the cloud-based system 100 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, malware detection, bandwidth control, Data Leakage Prevention (DLP), zero-day vulnerability protection, web 2.0 features, and the like. In an exemplary embodiment, the cloud-based system 100 may be viewed as Security-as-a-Service through the cloud, such as the IA.

In an exemplary embodiment, the cloud-based system 100 can be configured to provide mobile device security and policy systems and methods. The mobile device 150 may be similar to the server 200 (as illustrated in FIG. 2) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

As a cloud-based security system, the cloud-based system 100 has a distributed network, multi-tenant architecture. The cloud-based system 10 is configured to examine traffic over all ports and protocols including SSL encrypted traffic. The policies are configured to follow the user, regardless of their location or device. The cloud-based system 100 can provide security functionality combining findings from various different approaches to deliver a holistic perspective. The cloud-based system 100 can be capable of recognizing threats independent of signature feeds, and the cloud-based system 100 can propagate threat information across the cloud in real-time, i.e., zero-day or zero-hour determinations such as between the cloud nodes 102 and the central authority 106.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 102) at any time for policy-based secure Internet access. Two exemplary services for the cloud-based system 100 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), DLP, and the like. The PA can include access control, micro service segmentation, etc. For example, the IA service can provide a user with Internet Access and the PA service can provide a user with access to enterprise resources in lieu of traditional Virtual Private Networks (VPNs).

The central authority 106 is a supervisory management node, i.e., the "brains" of the cloud-based security system. The central authority 106 manages and monitors all cloud nodes 102 and ensures that they are always up-to-date with the latest real-time feeds and software and that they are synchronized to propagate threat intelligence cloud-wide. The central authority 106 directs users to the closest cloud node 102, ensuring that policy follows the user with minimum latency. The central authorities 106 are a globally distributed peer-to-peer cluster with an automatically elected master. This ensures all cloud components can always talk to a central authority 106 even if there are major Internet 104 outages that isolate an entire region. Through its multi-tenant architecture, the central authority 106 provides each organization with its own secure portal to administer policy. Any change to the policy is communicated to the cloud nodes 102 within seconds. The central authority 106 provides an end-user authentication framework through integration with Secure Lightweight Directory Access Protocol (LDAP) or ID Federation systems.

The cloud nodes 102 are configured to interface traffic with the users, e.g., the locations 110, 120, 130 and devices 140, 150. The cloud nodes 102 are configured to perform security, management, and compliance policies for the users, with the policies served by the central authority 106. The cloud nodes 102 can be an inline proxy that enforces policies on a user-level granularity. The cloud nodes 102 can scan every byte of a request, content, responses, and all related data for inline blocking of threats like viruses, cross site scripting (XSS), and botnets. This capability also enables Dynamic Content Classification (DCC) of unknown sites. By scanning each page, the cloud nodes 102 can determine a risk index for every page loaded that enables administrators to control content served to their users based on acceptable risk. The cloud nodes 102 can include authentication and policy distribution mechanisms that enables any user to connect to any cloud node 102 at any time enabling enterprises to simply point traffic to any cloud node 102 to ensure full policy enforcement while getting all reports back in real-time.

The log nodes 108 can be integrated with the cloud nodes 102 or separate. The log nodes 108 are configured to maintain logs of all user transactions, in a compressed manner. The logs can be transmitted every second to the log nodes 108 over secure connections from the cloud nodes 102, as well as a multicast to multiple servers for redundancy. The log nodes 108 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 108 can store and transfer logs in an encrypted format.

Exemplary Server Architecture

Referring to FIG. 2, in an exemplary embodiment, a block diagram illustrates a server 200 which may be used in the cloud-based system 100, in other systems, or standalone. For example, the cloud nodes 102, the central authority 106, and/or the log nodes 108 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
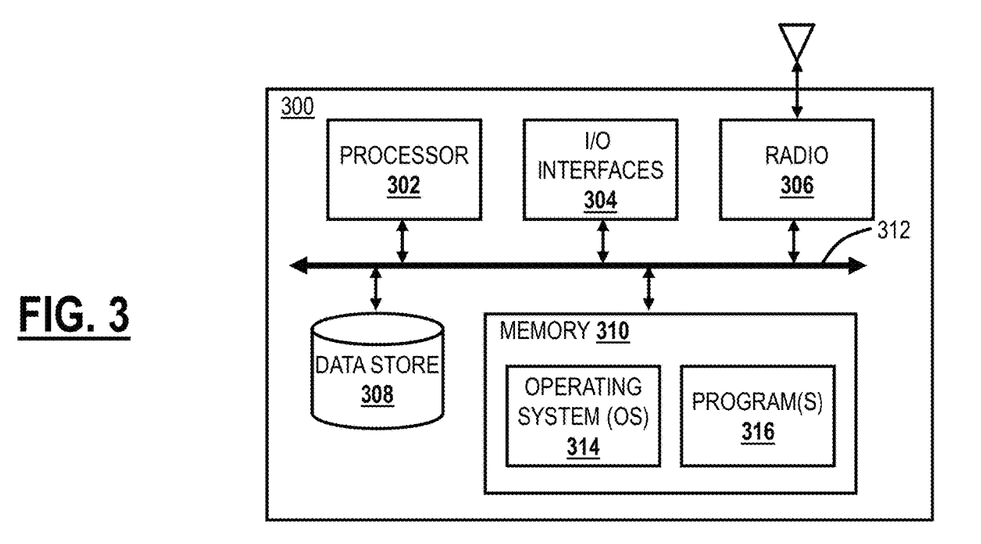

Referring to FIG. 3, in an exemplary embodiment, a block diagram illustrates a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

IOT and ZeroConf Device Monitoring System

Figure 4:
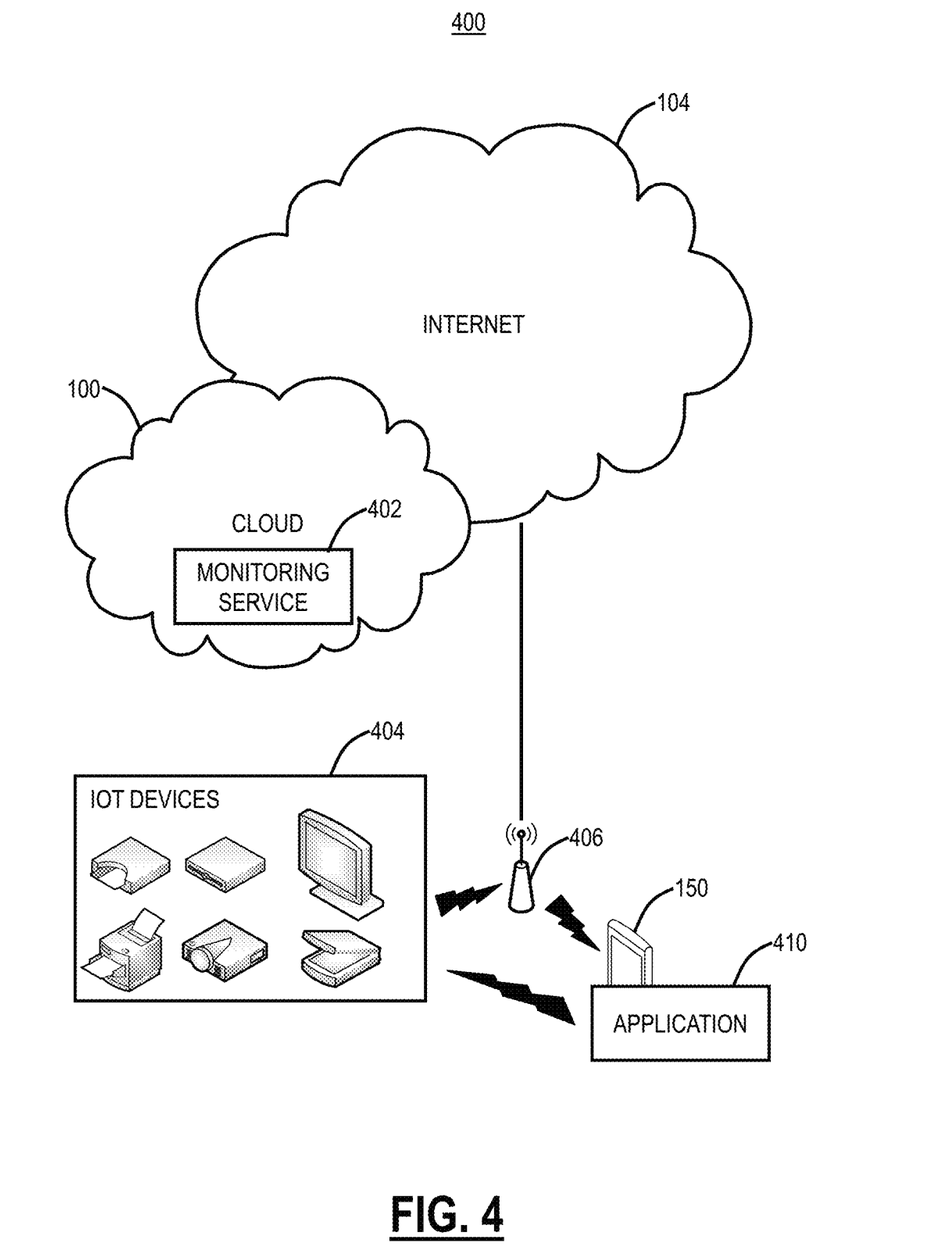
FIG. 4 is a network diagram of a network with a monitoring service implemented through the cloud-based system for security and control of IOT devices.

Referring to FIG. 4, in an exemplary embodiment, a network diagram illustrates a network 400 with a monitoring service 402 implemented through the cloud-based system 100 for security and control of devices 404. Again, the devices 404 can include IOT devices, ZeroConf devices, and the like. The IOT devices can include, without limitation, appliances, cameras, voice controllers (e.g., Google Home, Amazon Echo, etc.), thermostats and other sensors, media devices, medical monitors, home security devices, Wi-Fi devices, garage door controllers, doorbells, and the like. The ZeroConf devices can include, without limitation, printers, scanners, media players, and the like. Zeroconf and IOT are built on three core technologies: automatic assignment of numeric network addresses for networked devices, automatic distribution and resolution of computer hostnames, and automatic location of network services, such as printing devices. The devices 404 can be used in a residence, enterprise, retail location, etc. The devices 404 can communicate to an access point 406 such as using Wi-Fi, Bluetooth, etc. to obtain connectivity to the Internet 104. Due to the relative ease of deployment and the desire to have connectivity in all devices, the devices 404 are proliferating. As described herein, due to the ease of deployment, the devices 404 pose security risks.

The present disclosure relates to systems and methods for security and control of Internet of Things (IOT) and ZeroConf devices 404 using the cloud monitoring service 402 such as through cloud-based system 100. A mobile device 150 (or any other user equipment that supports applications such as the laptops/desktops 140 and the like) can have an application 410 installed which interacts with the monitoring service 402 in the cloud-based system 100 to monitor the devices 402. In another exemplary embodiment, a dedicated sensor can be placed at a location to monitor the devices 402 or the access point 406 can provide this functionality in addition to providing wireless access. Thus, the application 410 can operate on any processing device in a location for monitoring the devices 404 in proximity and/or on the local network, e.g., the access point 406. Collectively, the monitoring service 402 and the application 410 are configured to monitor the state of the devices 404. Of note, there can be a plurality of applications 410 distributed for covering various geographies to monitor the devices 404 therein.

Figure 5:
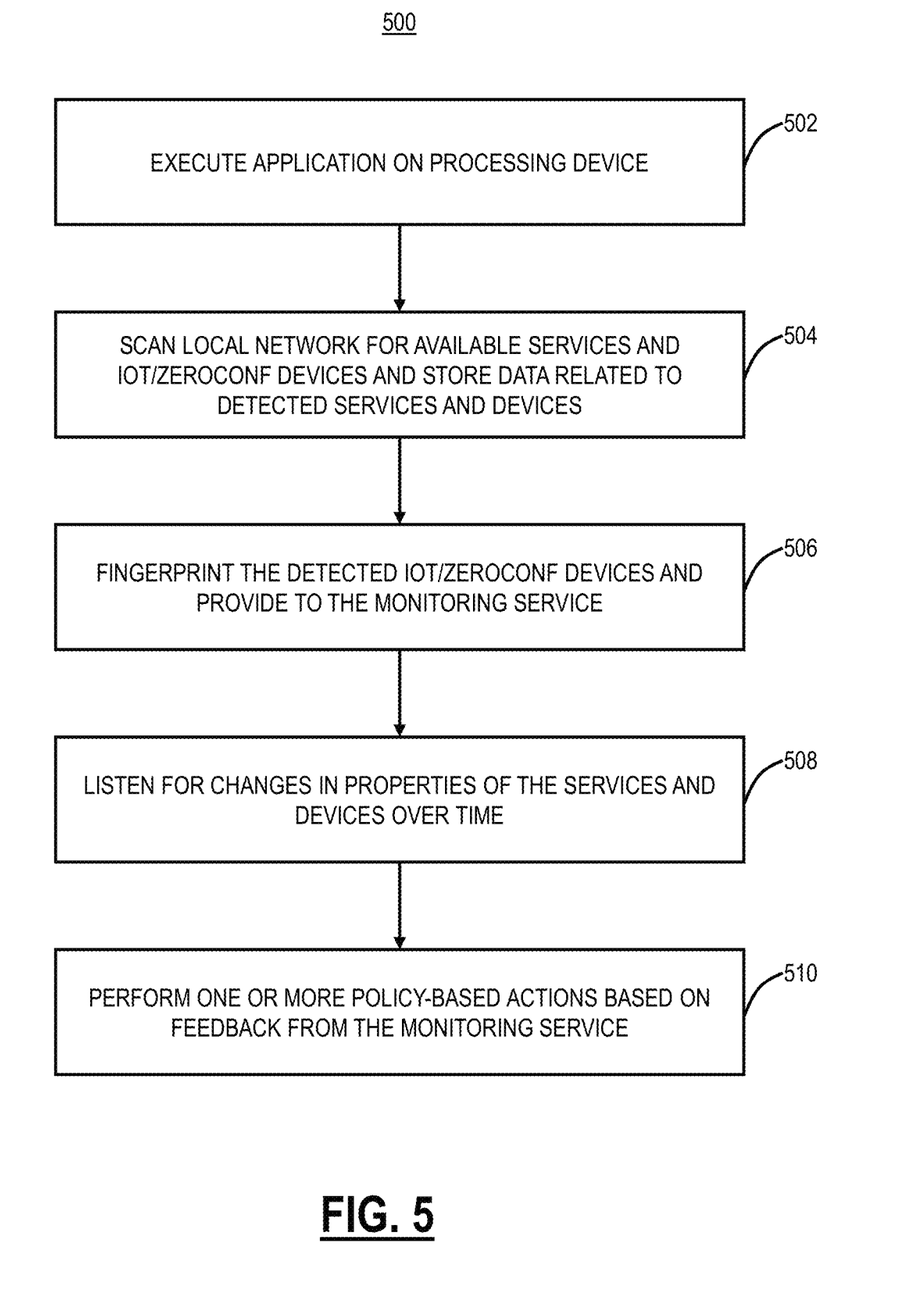
FIG. 5 is a flowchart of a method for IOT/ZeroConf device monitoring via the application.
Figure 6:
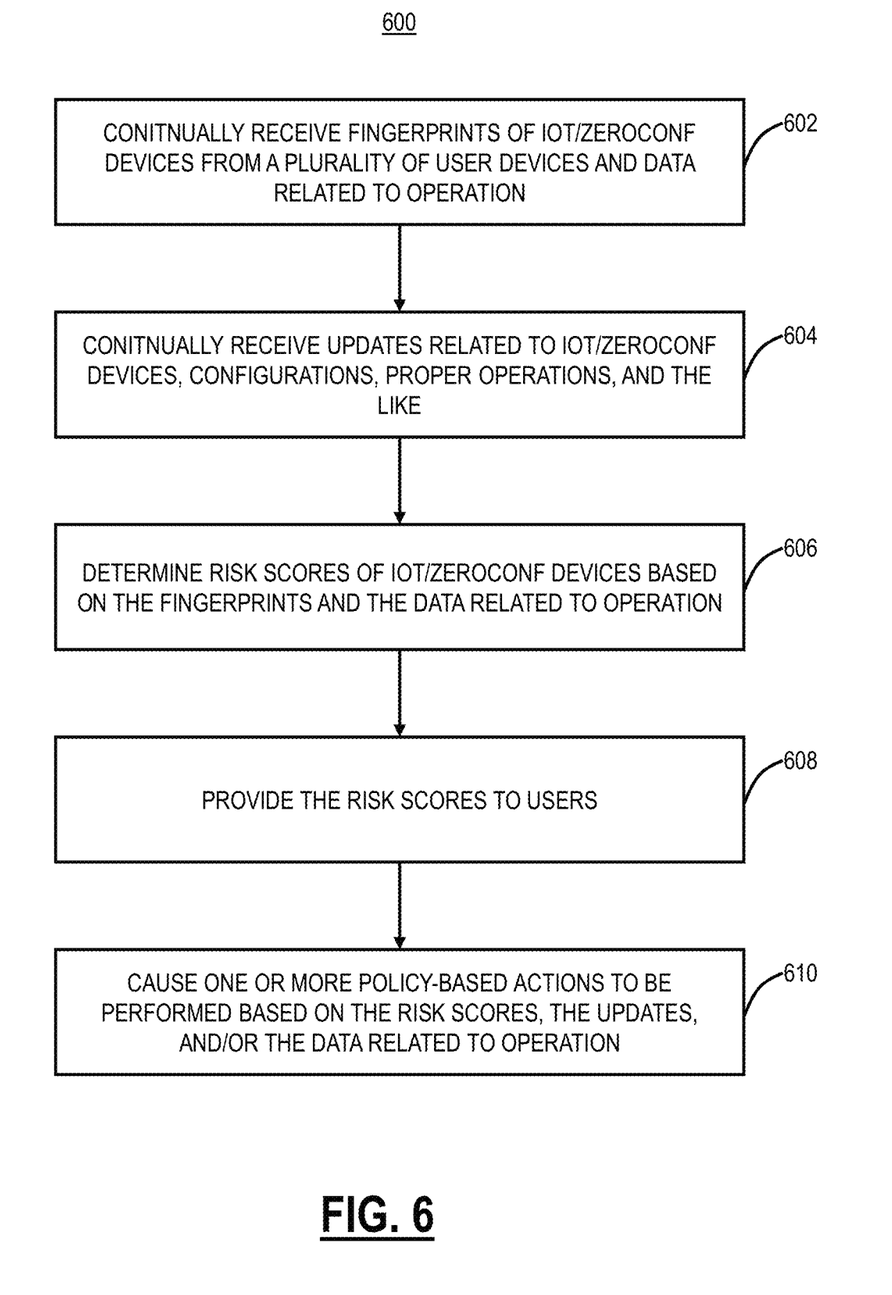
FIG. 6 is a flowchart of a method for IOT/ZeroConf device monitoring and control via the monitoring service.

Referring to FIG. 5, in an exemplary embodiment, a flowchart illustrates a method 500 for IOT/ZeroConf device monitoring via the application 410. Referring to FIG. 6, in an exemplary embodiment, a flowchart illustrates method 600 for IOT/ZeroConf device monitoring and control via the monitoring service. Specifically, the methods 500, 600 contemplate operation in the network 400 with the method 500 focusing on actions associated with the application 410 and the method 600 focusing on actions associated with the monitoring service 402.

In FIG. 5, the method 500 includes execution of the application 410 on a processing device (step 502). The processing device can be anything on the local network (e.g., the access point 406) which is capable of monitoring and executing the application 410. For example, the processing device can be the mobile device 150, the laptops/desktops 140, etc. The application 410 scans the local network for available services and IOT/ZeroConf devices 404 and stores data related to the detected services and devices (step 504). For example, the application 410 can maintain a table of the devices 404 in the local network and store the service type, service name, Internet Protocol (IP) address, Media Access Control (MAC) address, and port the devices 404 operate on. The application 410 can listen for any changes in these properties, such as at periodic configurable intervals.

Additionally, the application 410 can scan to determine if the devices 404 are running with default configurations, such as factory defined usernames and passwords (e.g., admin and admin). The application 410 can communicate with the monitoring service 402 to determine what the default configuration is and then see if the devices 404 respond. If the application 410 determines the devices 404 are running the default configuration, an alert can be raised to the user via the application 410 and/or to the monitoring service 402. Specifically, devices 404 running the default configuration are at significant risk as a malevolent actor can gain control of the devices 404 using the factory defined credentials.

The application 410 can also scan the devices 404 to find all the services that the devices 404 are broadcasting to other devices on the same network. The application 410 can create a database to record all of the services. The services can be anything supported by the devices 404 such as print services, media sharing services, display mirroring services, etc.

The application 410 fingerprints the detected devices 404 and provides this data to the monitoring service 402 (step 506). The fingerprint can be anything used to identify the IOT/ZeroConf devices 404. For example, the fingerprint can include a first component to identify the type/manufacturer of the devices 404, a second component to uniquely identify a specific model, and a third component to identify the configuration. For example, the first component can be high-level—type, manufacturer, model number, etc. The second component can be unique—e.g., MAC address, serial number, etc. The third component can be specific to the device—e.g., credentials, provisioned services, etc.

The monitoring service 402 can use the fingerprint to check for malicious signatures and provide this information to the application 410. For example, the monitoring service 402 can use all three of the components to detect security risks. The first and second component can be used to identify risky devices 404 in general while the third component can be configured to identify a device 404 which is poorly configured or which is exhibiting malicious behavior. The monitoring service 402 can store the fingerprints in a database for access control and reporting.

The application 410 can further listen for changes in the properties of the services and devices over time (step 508). The application 410 can listen for network packets in a promiscuous mode and record associated statistics, such as data in the IP packets. For example, once fingerprinted, the application 410 can periodically monitor for changes in the device 404 operations, including changes in the configuration and the behavior. The application 410 can continuously synchronize this information with the monitoring service 402. For example, the application can monitor the network activity of the fingerprinted devices 404 to inspect for any potential malware activity, such as communicating with a known malicious Botnet Command and Control (C&C) server or inspecting plain text Hypertext Transfer Protocol (HTTP) communication leaking user credentials.

The application 410 can be used to perform one or more policy-based actions such as based on feedback from the monitoring service 402 or based on local processing (step 510). For example, the policy actions can be communicated to the application 410 from the monitoring service 402. In an exemplary embodiment, the policy actions can include reporting and visibility to the user via the application 410 and/or to an IT administrator. This can include a notification of security risk and associated remedial actions, e.g., device X using factory credentials, login, and update; device Y is communicating to a botnet C&C server, disconnect and/or reinstall software; device Z is running a software version with known security risks, perform a software update.

In another exemplary embodiment, the application 410 can block all the outgoing broadcast/multicast IP packets based on the service type, users profile, and network criteria for the policy-based actions. For instance, in a trusted network, the user can be given access to all services that are deemed secure by the IT administrator for that user. The application 410 can be configured to block communications such as causing the devices 404 to be removed from the local network, i.e., the access point 406, causing communication ports associated with services from the devices 404 to be blocked. These actions can be automatic, such as when the application 410 is included or communicatively coupled to the access point 406, or manually such as instructions/alerts to a user via the application 410.

In FIG. 6, the monitoring service 402 continually receives fingerprints of IOT/ZeroConf devices 404 and data related to operation from a plurality of user devices executing the application 410 (step 602). Of note, the cloud-based system 100 can provide large scale monitoring such that the monitoring service 402 can receive fingerprint data from globally distributed networks running the application 410. This enables continuous updates of a risk score of IOT/ZeroConf devices 404 based on the network behavior of the devices 404.

Additionally, the monitoring service 402 can continually receive updates related to the IOT/ZeroConf devices 404, configurations, proper operations, and the like (step 604). Specifically, in step 602, the monitoring service 402 receives operational data of deployed devices 404 while in step 604, the monitoring service 402 receives updates on the devices 404—how they should operate, proper software versions, default username/passwords, etc. Thus, the monitoring service 402 has visibility of actual operations and preferred operations and can use this data to detect deviations, security risks, malicious behavior, etc.

The monitoring service 402 can determine risk scores of the IOT/ZeroConf devices 404 based on the fingerprints and the data related to operation (step 606). The risk scores can be some quantitative analysis of the potential risk of an IOT/ZeroConf device 404. For example, the risk score can be a weighted sum based on various factors including username/password, services operated, software version, known defects, traffic usage, etc.

The risk scores can be provided to the users such as via the application 410 (step 608). For example, a user can be provided a list of the IOT/ZeroConf devices 404 detected on their local network and associated risk scores.

The monitoring service 402 and the application 410 can work in conjunction with one another with the application 410 continually listening and updating the data related to the operation and the monitoring service 402 can use this data from the application 410 along with anomaly detection mechanisms to trigger security alerts. For instance, a sudden spike in traffic from an IOT device to a remote host can be signaled as a security alert.

The monitoring service 402 can cause one or more policy-based actions to be performed based on the risk scores, the updates, and/or data related to operation (step 610). The monitoring service 402 can instruct the application 410 to perform the actions as described in step 510. For example, depending on the enterprise security policy, access to the IOT/ZeroConf devices 404 can be blocked for users if some predefined criteria are met. For instance, access to printing services can be blocked in public networks, access to entertainment services can be blocked in an educational institute, etc.

With the advent of mobility and IOT in the consumer and enterprise space, it has become harder to limit the kind of hosts that reside on the corporate network. With the proliferation of such devices 404 that can automatically register themselves on the network using protocols based on Zero-Conf without the user's knowledge, there are serious security risks. The methods 500, 600 solve this problem by using the cloud-based system 100 to monitor the state of all the IOT devices and available services within the network to give power to IT administrators to restrict the kind of services that the users can avail based on the network type and user's privileges.

The methods 500, 600 provide the ability to control access to different services based on an enterprise's security criteria such as network type, operating system, and user's group essentially creating a dark net of services. The IT administrator has visibility to all the IOT/ZeroConf devices 404 that are on the network and their vulnerability status that is constantly updated using the cloud security database which collects data from several networks globally. For example, this can be maintained in the log node 108.

The applications 410 can alert users and IT administrators if there are multiple services in the network with the same name that can potentially be used to execute a Man-in-the-Middle (MITM) attack. By providing control and visibility to users on the services that are getting broadcasted from their own devices, the methods 500, 600 can protect inadvertent leakage and theft of user's sensitive data. Based on the user preferences, the application 410 can also block such broadcasted packets from going out of the user's device 150. By listening in a promiscuous mode, the application 410 can alert the IT administrator for any network wide attacks such as denial of service and botnet spread. By utilizing anomaly detection to study deviations in the normal traffic flow, the application 410 can trigger security alerts.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a processor to perform steps of:
    causing scanning of a network to detect one or more Internet of Things (IOT) and ZeroConf devices;
    based on the scanning, determining a fingerprint of the one or more detected IOT and ZeroConf devices based on at least one of static and dynamic behavior thereof, the fingerprint for each of the one or more detected IOT and ZeroConf devices including at least one of a type of device, a manufacturer of the device, a model of the device, and a configuration of the device; and
    providing the fingerprint of the one or more detected IOT and ZeroConf devices to a cloud service for access control and reporting, wherein the access control and reporting include a notification of security risk and associated remedial actions, the remedial actions being manual or automatic.

2. The non-transitory computer-readable storage medium of claim 1, wherein the computer readable code stored further programs the processor to perform steps of
    maintaining a database of the one or more detected IOT and ZeroConf devices; receiving updates from the cloud service based on the fingerprint of the one or more detected IOT and ZeroConf devices; and
    performing the access control based on the updates.

3. The non-transitory computer-readable storage medium of claim 1, wherein the computer readable code stored further programs the processor to perform steps of
determining a security risk of the one or more detected IOT and ZeroConf devices based on the fingerprint and updates from the cloud service.

4. The non-transitory computer-readable storage medium of claim 3, wherein the security risk is based in part on whether one or more detected IOT and ZeroConf devices utilize factory defined login credentials and/or leak sensitive user data over unencrypted channels.

5. The non-transitory computer-readable storage medium of claim 3, wherein the security risk is based in part on whether the one or more detected IOT and ZeroConf devices exhibit traffic spikes and/or communicate with any known malicious or botnet servers.

6. The non-transitory computer-readable storage medium of claim 1, wherein the scanning is in a promiscuous mode on the network.

7. The non-transitory computer-readable storage medium of claim 1, wherein the access control includes blocking of any of the one or more detected IOT and ZeroConf devices.

8. An apparatus comprising:
a network interface;
a processor communicatively coupled to the network interface; and
memory storing instructions that, when executed, cause the processor to:
cause scanning of a network to detect one or more Internet of Things (IOT) and ZeroConf devices;
based on the scanning, determine a fingerprint of the one or more detected IOT and ZeroConf devices based on at least one of static and dynamic behavior thereof, the fingerprint for each of the one or more detected IOT and ZeroConf devices including at least one of a type of device, a manufacturer of the device, a model of the device, and a configuration of the device; and
provide the fingerprint of the one or more detected IOT and ZeroConf devices to a cloud service for access control and reporting, wherein the access control and reporting include a notification of security risk and associated remedial actions, the remedial actions being manual or automatic.

9. The apparatus of claim 8, wherein the instructions that, when executed, further cause the processor to
maintain a database of the one or more detected IOT and ZeroConf devices;
receive updates from the cloud service based on the fingerprint of the one or more detected IOT and ZeroConf devices; and
perform the access control based on the updates.

10. The apparatus of claim 8, wherein the instructions that, when executed, further cause the processor to
determine a security risk of the one or more detected IOT and ZeroConf devices based on the fingerprint and updates from the cloud service.

11. The apparatus of claim 10, wherein the security risk is based in part on whether one or more detected IOT and ZeroConf devices utilize factory defined login credentials and/or leak sensitive user data over unencrypted channels.

12. The apparatus of claim 10, wherein the security risk is based in part on whether the one or more detected IOT and ZeroConf devices exhibit traffic spikes and/or communicate with any known malicious or botnet servers.

13. The apparatus of claim 8, wherein the scanning is in a promiscuous mode on the network.

14. The apparatus of claim 8, wherein the access control includes blocking of any of the one or more detected IOT and ZeroConf devices.

15. A method comprising:
causing scanning of a network to detect one or more Internet of Things (IOT) and ZeroConf devices;
based on the scanning, determining a fingerprint of the one or more detected IOT and ZeroConf devices based on at least one of static and dynamic behavior thereof, the fingerprint for each of the one or more detected IOT and ZeroConf devices including at least one of a type of device, a manufacturer of the device, a model of the device, and a configuration of the device; and
providing the fingerprint of the one or more detected IOT and ZeroConf devices to a cloud service for access control and reporting, wherein the access control and reporting include a notification of security risk and associated remedial actions, the remedial actions being manual or automatic.

16. The method of claim 15, further comprising
maintaining a database of the one or more detected IOT and ZeroConf devices;
receiving updates from the cloud service based on the fingerprint of the one or more detected IOT and ZeroConf devices; and
performing the access control based on the updates.

17. The method of claim 15, further comprising
determining a security risk of the one or more detected IOT and ZeroConf devices based on the fingerprint and updates from the cloud service.

18. The method of claim 17, wherein the security risk is based in part on whether one or more detected IOT and ZeroConf devices utilize factory defined login credentials and/or leak sensitive user data over unencrypted channels.

19. The method of claim 17, wherein the security risk is based in part on whether the one or more detected IOT and ZeroConf devices exhibit traffic spikes and/or communicate with any known malicious or botnet servers.

20. The method of claim 15, wherein the access control includes blocking of any of the one or more detected IOT and ZeroConf devices.

* * * * *